Patented Nov. 2, 1926.

1,605,756

UNITED STATES PATENT OFFICE.

ADOLPH MILLER, OF KIRKWOOD, MISSOURI.

ELECTROLYTE AND METHOD OF MAKING THE SAME.

No Drawing. Application filed July 19, 1924. Serial No. 726,941.

My invention relates to improvements in electrolyte for storage batteries and the method of making the same and has for its primary object, an electrolyte which is non-fluid and which when employed will permit the battery to be recharged.

A further object is to manufacture an electrolyte which can be readily poured into a storage battery so that the same will be thoroughly filled therewith and from which practically all of the moisture is withdrawn. This permits the storage battery to be used in places where a battery of the ordinary type, that is one using liquid electrolyte cannot be readily used, as there is no danger of spilling or having the electrolyte run on the floor when the same is upset or laid on its side. In fact a storage battery using my electrolyte may almost be termed a dry cell storage battery because the amount of moisture contained therein is so small as to be practically negligible.

In making my electrolyte the following ingredients are used—litharge, lead sulphate, lead peroxide, sulphuric acid of about 1100 specific gravity and distilled water.

The manner of making the same is as follows—for approximately ten pounds of electrolyte, the following proportions are used—I first take about five pounds of litharge, three pounds of lead peroxide and one pound of lead sulphate and mix them with distilled water in separate vessels, sufficient water is added to make the mixture in each receptacle about the consistency of paint when stirred up. I next take a vessel which is provided with electrodes, both positive and negative, and place therein about five gallons of sulphuric acid of approximately 1100 specific gravity.

A direct electric current of from four to six volts and from twenty-four to thirty amperes is passed through these electrodes and the acid in the vessel is agitated. As soon as this is done, the litharge and distilled water is slowly added while the acid is being continuously agitated, and after the litharge has been thus added, the lead peroxide is added in the same way to the mixture of litharge and acid, and lastly the lead sulphate is added to the mixture of the above two mixtures and acid. This current is kept flowing continuously for about forty-eight (48) hours and the contents of the vessel kept continuously agitated to prevent any of the lead salts from settling to the bottom. At frequent intervals both a hydrometer test and thermometer test is made, it being desirable to keep the acid strength down below 1200 and as near 1100 specific gravity as possible.

In taking the temperature test, should the temperature of the mixture rise above 100 degrees F. the amperage of the current is cut down until the temperature of the mixture again is 100 degrees F. or less.

After being acted on by the electric current for this length of time, that is, about forty-eight hours, the mixture is withdrawn from the receptacle and is ready to put into the battery cell.

The above mixture is of substantially the same consistency as paint or probably molasses and in this condition will flow readily around the battery plates and fill the cell completely.

After the mixture has stood in the battery cell for a short length of time, the lead salts will settle to the bottom and a clear liquid remain above. This liquid is then drawn off and more of the agitated mixture having the lead salts in suspension therein, added. This is continued until the lead salts completely cover the plates, after which all of the liquid above the settled salts in the jars is drawn off. The cell is now ready to be capped and put into use.

In a short time the upper surface of the electrolyte partially drys out and forms a crust which retains the moisture in the remainder of the electrolyte. The cell will now take a charge in the usual way and should the electrolyte at any time become too dry, it can be moistened slightly with distilled water.

An electrolyte formed of the proportions as mentioned above, that is, five pounds litharge, three pounds lead peroxide and one pound lead sulphate, retains enough of the acid to make it weigh ten pounds or approximately two pounds of acid are retained.

I may also if desired, take my electrolyte, after the same has been made in the above described manner, and drain off practically all of the moisture and pack it in containers for a distribution and sale. In this instance, the electrolyte is removed from the container and placed in a jar and sufficient acid of 1100 specific gravity added to make the mixture a semi-liquid which can be readily poured into the battery jars. The excess acid required to make the mixture semi-liquid being drawn off as before stated.

It will be understood of course, that the water which is added to the acid, together with the lead salts is decomposed by the action of the electric current so that the acid will gradually gain in specific gravity. This necessitates the frequent hydrometer tests previously mentioned.

Having fully described my invention, what I claim is:—

1. An electrolyte composed of litharge, lead sulphate, lead peroxide and sulphuric acid which has been subjected to the action of an electric current and from which the surplus acid has been removed.

2. An electrolyte containing the following ingredients by weight—litharge fifty per cent, lead peroxide thirty per cent, lead sulphate ten per cent and sulphuric acid ten per cent.

3. The method of making an electrolyte which consists in subjecting an agitated quantity of sulphuric acid to the action of an electric current, and adding to said sulphuric acid during such treatment, litharge, lead peroxide and lead sulphate, continuing the agitation and application of the electric current for a predetermined period and then draining away surplus acid.

4. The method of making an electrolyte which consists in first subjecting sulphuric acid to an electric current, agitating said acid, adding to said acid while being agitated and acted on by the current, a mixture of litharge and distilled water, adding to the resulting mixture a mixture of lead peroxide and distilled water, then adding thereto a mixture of lead sulphate and distilled water, continuing the agitation and the action of the electric current for a predetermined period, and then removing a sufficient amount of acid to render the mixture a thick fluid.

5. The method of making an electrolyte which consists in agitating a quantity of sulphuric acid, litharge, lead peroxide, lead sulphate and distilled water, subjecting said mixture during such agitation to a direct electric current for approximately forty-eight hours, regulating the amperage of said current so as to maintain the temperature of the mixture at approximately 100 degrees F., adding distilled water to said mixture from time to time so as to maintain the specific gravity of the sulphuric acid below 1200, then settling said mixture and lastly draining off surplus acid.

6. The method of making an electrolyte which consists in adding to approximately five gallons of sulphuric acid of 1100 specific gravity, five pounds litharge, three pounds of lead peroxide and one pound of lead sulphate which have been previously mixed with distilled water, agitating the resulting mixture continuously, passing through said mixture while under constant agitation an electric current of from four to six bolts and from twenty-four to thirty amperes for a period of approximately forty-eight hours, regulating the amperage of said current so as to maintain the agitated mixture at a temperature of approximately 100 degrees F., maintaining the specific gravity of the acid in said mixture during the treatment below 1200, precipitating the solids of said mixture by settling and lastly draining off surplus acid.

In testimony whereof, I have signed my name to this specification.

ADOLPH MILLER.